Feb. 10, 1959  H. B. DRAPEAU  2,873,070
DOUBLE OPENING WATERLINE THERMOSTAT
Filed Dec. 20, 1954
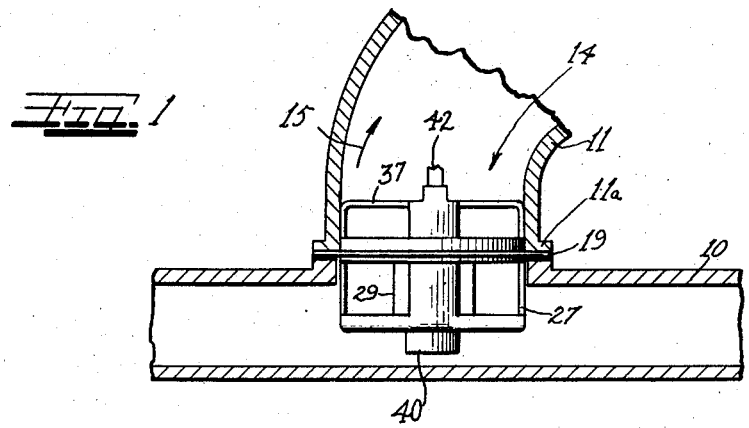
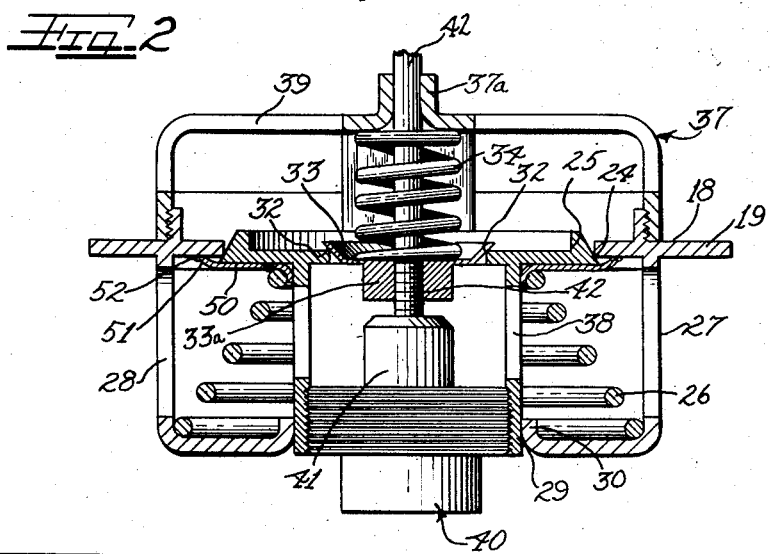
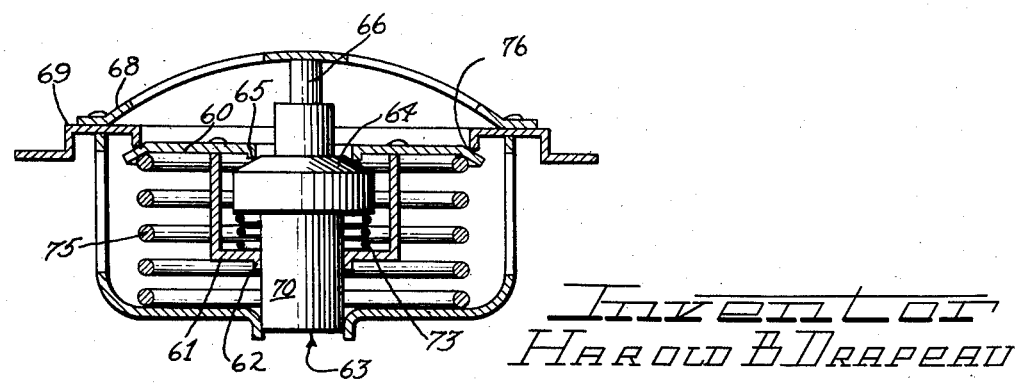
Inventor
Harold B. Drapeau United States Patent Office 2,873,070
Patented Feb. 10, 1959

2,873,070

DOUBLE OPENING WATERLINE THERMOSTAT

Harold B. Drapeau, Oak Park, Ill., assignor to The Dole Valve Company, Chicago, Ill., a corporation of Illinois Application December 20, 1954, Serial No. 476,168

5 Claims. (Cl. 236—34)

This invention relates to improvements in thermally responsive valves adapted for use in the cooling systems of automobiles.

It is an object of the present invention to provide a thermally responsive valve which will automatically shift from a low flow range during cold weather to a high flow range during hot weather.

It is a further object of the present invention to provide a thermally responsive valve which is operative to provide optimum efficiency of an automobile heater unit during cold weather while at the same time providing optimum engine cooling in hot weather.

Another object of the present invention is to provide a thermostatic valve which readily adapts itself to hot and cold weather conditions without special adjustment.

Other objects, features and advantages of the present invention will be readily apparent from the following detailed description taken in conjunction with the accompanying drawings, in which:

Figure 1 is a fragmentary side elevational view with certain parts broken away and in section and showing a first thermally responsive valve embodying the features of the present invention in position in the circulatory system of an automobile internal combustion engine;

Figure 2 is a diagrammatic enlarged vertical sectional view of the thermally responsive valve of Figure 1;

Figure 3 is a diagrammatic vertical sectional view illustrating a second form of thermally operated valve constructed in accordance with the present invention.

As shown on the drawings:

In Figure 1 a portion of the jacket 10 of an internal combustion engine is connected by a pipe or connection 11 with the radiator (not shown). For controlling flow of the coolant from the engine jacket to the radiator, a valve 14 may be interposed at any suitable point in the path of flow, the direction of flow being indicated by the arrow 15.

Referring more specifically to Figure 2, it will be observed that the valve comprises an annular body 18 having an annular flange 19. The flange may be clamped between the engine jacket 10 and a flange 11a on the connection tube 11 by means of suitable fastening devices (not shown). The body 18 provides a relatively large diameter valve seat 24 for cooperation with a main valve member 25 in controlling flow under hot weather conditions where a large volume of flow is required. The valve member 25 is urged into seating engagement to the valve seat 24 by means of a main spring 26 acting on the valve member at its upper end and seated at its lower end against a bracket 27 depending from the valve body 18. The bracket 27 is, of course, provided with suitable apertures 28 for accommodating flow therethrough.

For guiding the reciprocal movement of the main valve member 25 into and out of closing relation to the valve seat 24, the main valve member 25 is provided with an extension 29 of generally cylindrical configuration which extends in sliding relation to an annular lower guide flange 30 provided at the lower inner portion of the bracket 27.

For providing a small sized metering valve for handling the cold weather requirements of the engine, the main valve member 25 has a central valve seat 32 of smaller diameter than the valve seat 24 for cooperation with an auxiliary valve member 33 controlling flow through an aperture in the main valve member 25. The auxiliary valve member 33 is urged into seating engagement with the valve seat 32 by means of an auxiliary spring 34 which is seated at its upper end against an upper bracket 37 and at its lower end acts on the auxiliary valve member 33. The extension 29 is provided with flow apertures 38 while the bracket 37 has apertures 39.

For actuating the valve members in response to the temperature of the coolant in the engine jacket, a conventional thermo-responsive element 40 is provided comprising a casing 41, a piston 42 slidable in the casing and an expansible substance disposed in the casing in communication with the piston 42 for urging the piston outwardly upon expansion thereof. This expansible substance may suitably be one that will expand or contract due to changes in temperature and which is of such fusible crystalline character that when combined with other materials it will undergo its change of state in the desired temperature range. A well known thermo-responsive unit of this type is known as a "Vernet" unit.

As seen in Figure 2, the casing 41 of the thermo-responsive unit is threadedly secured to the main valve member extension 29 while the piston 42 is threadedly secured to a base portion 33a of auxiliary valve member 33. Thus, as the substance in the unit 40 expands due to increased temperature, the piston will be forced outwardly relative to the casing 41 to unseat auxiliary valve member 33. Since the initial tension exerted by main spring 26 exceeds the opposite force exerted by auxiliary spring 34, the spring 26 will initially prevent downward displacement of the casing 41 as the material in the casing expands.

However, as the material in the casing 31 continues to expand and continues to compress the auxiliary spring 34, the springs 26 and 34 are so designed that a point will be reached where the downward force exerted by the auxiliary spring 34 equals and begins to exceed the upward force exerted by the main spring 26. When this point is reached, the casing 41 is forced downwardly to move the main valve member 25 downwardly against the action of the main spring 26.

It will thus be apparent that by proper selection of the main and auxiliary springs 26 and 34, the auxiliary valve member 33 will open before the main valve member 25. The characteristics of the thermo-responsive power unit 40 are preferably selected so that in relatively cold weather only the auxiliary valve member 33 moves to open position, while in hot weather the increased expansion of the power unit 40 causes the main valve member 25 to also move to open position and thus to provide the increased circulation of water required in hot weather. The rod part of piston 42 is guided at its upper end by portion 37a of bracket 37.

As illustrated in Figure 2, the main valve member 25 is preferably provided with a resilient washer like member 50 having an upturned peripheral edge 51 disposed for engagement with the underside 52 of the valve body 18 prior to complete seating of the main valve member 25 against the valve seat 24. The member 50 is so constructed that during closure of valve 25 the edge 51 thereof tends to slide radially on the undersurface 52 to provide a self cleaning action. Specifically, the member 50 is held against the underside of valve member 25 and is of normal configuration such that the edge 51 is flexed toward the radial direction during seating of the valve member 25.

Referring now to Figure 3, it will be observed that a main valve member 60 has a depending bracket 61 providing a guide 62 for a thermo-responsive unit 63. The unit 63 carries an auxiliary valve member 64 cooperating with a valve seat 65 provided by the valve body 60. A piston element 66 of thermo-responsive unit 63 may be secured to an upper bracket 68 carried with the valve body 69. The piston 66 is fixed to the upper bracket 69 so that expansion of the substance in casing 70 of the unit causes the casing to move downwardly. As the casing 70 moves downwardly the auxiliary valve member 64 moves away from its seat 65 against the action of the auxiliary spring 73.

A main spring 75 urges the main valve member 60 into seating relation to the valve seat 76 and applies an initial upward force against the main valve member which is greater than the initial downward force exerted by the auxiliary spring 73 as the auxiliary valve member 64 moves away from the seat 65. The main and auxiliary springs are so proportioned that only the auxiliary valve member 64 opens during a low temperature range while the main valve member moves to open position in a high temperature range.

It will be understood that in each of the embodiments the auxiliary valve provides a finer metering and more even temperature control in cold weather, while the main valve meets the high flow requirements for hot weather control. The present invention thus provides a composite thermostatic valve which meets engine requirements more effectively than a single valve of any selected size.

The resilient washer 50 in Figure 2 performs a very important function besides the self-cleaning action heretofore mentioned, namely, the washer 50 functions to seal the large valve port 24 against possible leakage in the cold weather season by tightly and resiliently engaging both the valve 25 and the valve body 18 about the entire periphery of the port.

It will be understood that many modifications and variations may be effected without departing from the scope of the novel concepts of the present invention.

I claim as my invention:

1. A thermostatic valve assembly for the water circulatory system of an internal combustion engine, comprising a composite valve having a relatively small port and having a relatively large port, a main valve member for controlling flow through said relatively large port, a main spring urging said main valve member toward closing relation to said relatively large port, an auxiliary valve member controlling flow through said relatively small port, an auxiliary spring operatively connected to said auxiliary valve member for urging the auxiliary valve member toward closing relation to said small port, the closing force exerted by said main spring on said main valve member when the main valve member is in maximum flow restricting relation to said relatively large port exceeding the force exerted by said auxiliary spring in urging said auxiliary valve member toward closing relation, and a thermal responsive power unit comprising relatively movable members one connected with said auxiliary valve member and the other connected with said main valve member, said power unit upon an initial increase in temperature moving said auxiliary valve member toward fully open relation to said relatively small port and upon a further increase of temperature moving said main valve member toward fully open relation to said relatively large port.

2. A thermostatic valve assembly for the water circulatory system of an internal combustion engine, comprising a composite valve having a relatively small port and having a relatively large port, a main valve member for controlling flow through said relatively large port, a main spring urging said main valve member toward closing relation to said relatively large port, an auxiliary valve member controlling flow through said relatively small port, an auxiliary spring operatively connected to said auxiliary valve member for urging the auxiliary valve member toward closing relation to said small port, the closing force exerted by said main spring on said main valve member when the main valve member is in maximum flow restricting relation to said relatively large port exceeding the force exerted by said auxiliary spring in urging said auxiliary valve member toward closing relation, and a power unit operatively connected to said auxiliary valve member to urge the auxiliary valve member toward fully open relation to said relatively small port, and said main valve member being connected to said auxiliary valve member through said auxiliary spring, and said power unit being operative to move said main valve member toward fully open relation to said relatively large port when the force exerted by said auxiliary spring member against opening of said auxiliary valve member exceeds the force exerted by the main spring against opening of the main valve member.

3. A thermostatic valve assembly for the water circulatory system of an internal combustion engine, comprising a valve body defining a relatively large port, a main valve member for controlling flow through said main port, main spring means for urging said main valve member toward closing relation to said relatively large port, said main valve member defining a relatively small port centrally thereof, an auxiliary valve member controlling flow through said relatively small port, an auxiliary spring urging said auxiliary valve member toward closing relation to said relatively small port, and a thermally responsive power unit comprising a pair of relatively movable members, one of said members being operatively connected to said main valve member and the other of said members being connected to said auxiliary valve member for urging said auxiliary valve member toward fully open relation to said relatively small port in one direction and for urging said main valve member toward fully open relation to said relatively large port in the opposite direction upon expansion of said power unit with increasing temperature, the auxiliary spring and the main spring being related to initially accommodate flow primarily through said relatively small port and to thereafter with further increase of temperature to accommodate flow through said relatively large port.

4. A thermostatic valve assembly for the water circulatory system of an internal combustion engine, comprising a valve body defining a relatively large port, a main valve member controlling flow through said relatively large port, said main valve member defining a relatively small port centrally thereof, an auxiliary valve member controlling flow through said relatively small port, main spring means for urging said main valve member toward closing relation to said relatively large port, an auxiliary spring interposed between said main valve member and said auxiliary valve member for urging said auxiliary valve member toward closing relation to said relatively small port, and a thermally responsive power unit connected to said auxiliary valve member for urging said auxiliary valve member toward open relation to said relatively small port upon increase of temperature within a first relatively low temperature range and for acting on said main valve member through said auxiliary spring to move said main valve member toward open relation to said relatively large port upon increase in temperature within a second relatively high temperature range.

5. A thermostatic valve assembly for the water circulatory system of an internal combustion engine, comprising a valve body providing an annular relatively large port, providing a first axial guide axially of said relatively large port and downstream thereof and providing a second axial guide axially disposed with respect to said relatively large port and upstream thereof, a main valve member for controlling flow through said relatively large port and movable in the upstream direction toward open relation to said relatively large port, main spring means urging said main valve member in the downstream direction, said main valve member providing a relatively small port centrally thereof, an auxiliary valve member controlling flow through said relatively small port and movable in the downstream direction toward open relation to said relatively small port, auxiliary spring means urging said auxiliary valve member in the upstream direction, said main valve member having an extension slidably related to said second guide, and a power unit having a body connected with said extension and having a relatively movable piston connected to said auxiliary valve member and slidable in said first guide said power unit upon expansion with increasing temperature first moving said auxiliary valve member in the downstream direction to increase flow through said relatively small port and upon the force exerted by said auxiliary spring exceeding the force exerted by said main spring then moving said main valve member in the upstream direction to increase flow through said relatively large port.

References Cited in the file of this patent

UNITED STATES PATENTS

| | | |
|---|---|---|
| 39,772 | Hoard et al. | Sept. 1, 1863 |
| 908,138 | Ricksecker | Dec. 29, 1908 |
| 1,784,061 | Giesler | Dec. 9, 1930 |
| 2,174,042 | Rose | Sept. 26, 1939 |
| 2,353,577 | Magrum | July 11, 1944 |
| 2,356,958 | Wangenheim | Aug. 29, 1944 |
| 2,650,028 | Grayson | Aug. 25, 1953 |
| 2,702,052 | Grayson | Feb. 15, 1955 |
| 2,709,065 | Pohndorf | May 24, 1955 |
| 2,770,443 | Rand | Nov. 13, 1956 |

FOREIGN PATENTS

| | | |
|---|---|---|
| 591,449 | France | Apr. 9, 1925 |